US012754295B2

(12) United States Patent
Jung et al.

(10) Patent No.: US 12,754,295 B2
(45) Date of Patent: Oct. 6, 2026

(54) METHODS AND DEVICES FOR REDUCING EYE SAFETY MINIMUM DISTANCES IN CONJUNCTION WITH ILLUMINATION LASER RADIATION

(71) Applicant: Rheinmetall Waffe Munition GmbH, Südheide (DE)

(72) Inventors: Markus Jung, Eicklingen (DE); Thomas Baumgärtel, Celle (DE); Klaus Ludewigt, Hamburg (DE); Jürgen Schmitz, Gifhorn (DE)

(73) Assignee: Rheinmetall Waffe Munition GmbH, Südheide (DE)

( * ) Notice: Subject to any disclaimer, the term of this patent is extended or adjusted under 35 U.S.C. 154(b) by 927 days.

(21) Appl. No.: 18/158,523

(22) Filed: Jan. 24, 2023

(65) Prior Publication Data

US 2023/0161013 A1 May 25, 2023

Related U.S. Application Data

(63) Continuation of application No. PCT/EP2021/070625, filed on Jul. 23, 2021.

(30) Foreign Application Priority Data

Jul. 24, 2020 (DE) ..................... 10 2020 119 620.2

(51) Int. Cl.
*G01S 7/484* (2006.01)
*G01S 17/10* (2020.01)

(52) U.S. Cl.
CPC .............. *G01S 7/484* (2013.01); *G01S 17/10* (2013.01)

(58) Field of Classification Search
CPC .......... G01S 7/484; G01S 17/10; G01S 17/66; F41H 13/005
See application file for complete search history.

(56) References Cited

U.S. PATENT DOCUMENTS 3,946,233 A 3/1976 Erben et al.
4,047,117 A * 9/1977 Tuchyner .............. H01S 3/2383 359/335

(Continued)

FOREIGN PATENT DOCUMENTS

CN 110 487 120 A 11/2019
DE 3 202 432 A1 8/1983

(Continued)

OTHER PUBLICATIONS

Setup of a Beam Control System for High Power Laser Systems at DLR, Buske, Ivo und Walther, Andreas (2016) Setup of a Beam Control System for High Power Laser Systems at DLR. In: Proceedings of SPIE—The International Society for Optical Engineering. SPIE Security & Defence, Sep. 26-29, 2016, Edinburgh, G8. doi; 10.1117/12.2240942. ISSN 0277-786X.

(Continued)

*Primary Examiner* — Yuqing Xiao
*Assistant Examiner* — Jempson Noel
(74) *Attorney, Agent, or Firm* — Harness, Dickey & Pierce, P.L.C.

(57) ABSTRACT

A method is presented for operating a laser radiation device (10) that has an illumination laser (14) and an active laser (13), and wherein, in a first operating mode of the laser radiation device (10) in which the active laser (13) does not emit any active laser radiation (20), the illumination laser (14) is operated in such a way that its illumination laser radiation (22) has a first illumination laser radiant flux. The method is characterized in that, in a second operating mode of the laser radiation device (10) in which the active laser (13) emits active laser radiation (20), the illumination laser (14) is operated such that its illumination laser radiation (22) has a second illumination laser radiant flux that is greater than the first illumination laser radiant flux.

5 Claims, 5 Drawing Sheets

(56) References Cited

U.S. PATENT DOCUMENTS

| | | | | |
|---|---|---|---|---|
| 5,600,434 | A * | 2/1997 | Warm | F41G 7/224 356/139.08 |
| 5,837,996 | A | 11/1998 | Keydar | |
| 6,250,583 | B1 | 6/2001 | Livingston | |
| 6,343,766 | B1 * | 2/2002 | Livingston | G01S 7/4811 244/3.13 |
| 7,006,203 | B1 * | 2/2006 | Book | G01C 3/08 356/5.04 |
| 7,745,777 | B2 | 6/2010 | Chen | |
| 7,978,313 | B2 * | 7/2011 | Guthrie | G01S 17/66 356/4.01 |
| 8,218,589 | B1 | 7/2012 | Saunders | |
| 8,319,170 | B2 * | 11/2012 | Alameh | H04W 52/0251 250/221 |
| 10,444,328 | B1 | 10/2019 | Saunders | |
| 2003/0062468 | A1 | 4/2003 | Byren et al. | |
| 2005/0185403 | A1 * | 8/2005 | Diehl | F41H 13/0056 362/228 |
| 2006/0022115 | A1 | 2/2006 | Byren | |
| 2007/0109784 | A1 | 5/2007 | Kosnik et al. | |
| 2009/0219962 | A1 | 9/2009 | Meyers et al. | |
| 2009/0296070 | A1 | 12/2009 | Guthrie | |
| 2010/0148033 | A1 | 6/2010 | Hunt | |
| 2010/0177929 | A1 * | 7/2010 | Kurtz | H04N 9/3194 382/173 |
| 2012/0292481 | A1 | 11/2012 | Hutchin | |
| 2013/0016514 | A1 | 1/2013 | Stacey et al. | |
| 2014/0125964 | A1 | 5/2014 | Jonas | |
| 2014/0368814 | A1 | 12/2014 | Krupkin et al. | |
| 2016/0298940 | A1 | 10/2016 | Moraites et al. | |
| 2017/0192094 | A1 | 7/2017 | Marron et al. | |
| 2017/0373454 | A1 * | 12/2017 | Hay | G02B 26/10 |
| 2018/0143324 | A1 * | 5/2018 | Keilaf | G02B 26/10 |
| 2020/0025531 | A1 | 1/2020 | Jung et al. | |
| 2021/0103056 | A1 * | 4/2021 | Braunreiter | H04N 23/56 |
| 2021/0405245 | A1 * | 12/2021 | Mo | G01V 13/00 |

FOREIGN PATENT DOCUMENTS

| | | | |
|---|---|---|---|
| DE | 44 44 637 | A1 | 6/1996 |
| DE | 10 2010 051 097 | A1 | 5/2012 |
| DE | 10 2012 022 039 | A1 | 5/2014 |
| DE | 10 2015 006 798 | A1 | 12/2016 |
| DE | 10 2017/ 100 068 | A1 | 7/2018 |
| DE | 10 2017 002 882 | B3 | 8/2018 |
| DE | 10 2018 100 414 | A1 | 7/2019 |
| DE | 10 2018 100 417 | A1 | 7/2019 |
| DE | 10 2018 100 891 | A1 | 7/2019 |
| DE | 10 2019 003 325 | B3 | 7/2020 |
| EP | 0 836 100 | A2 | 4/1998 |
| EP | 922 968 | A2 | 6/1999 |
| EP | 2 427 719 | A1 | 3/2012 |
| EP | 2 462 400 | A1 | 6/2012 |
| EP | 2 623 919 | A2 | 8/2013 |
| EP | 3 011 255 | | 4/2016 |
| EP | 3 014 211 | A1 | 5/2016 |
| EP | 3 465 272 | A1 | 4/2019 |
| WO | WO-2006 /022830 | A2 | 3/2006 |
| WO | WO-2010129086 | A1 | 11/2010 |
| WO | WO-2011015175 | A1 | 2/2011 |
| WO | WO-2014203250 | A1 | 12/2014 |
| WO | WO-2014209422 | | 12/2014 |
| WO | WO-2017/013315 | A1 | 1/2017 |
| WO | WO-2017/189136 | A1 | 11/2017 |
| WO | WO-2017213722 | A1 | 12/2017 |
| WO | WO-2019/239134 | A1 | 12/2019 |
| WO | WO-2020/008 465 | A1 | 1/2020 |

OTHER PUBLICATIONS

Video Rheinmetall Hochenergie-Laserwaffe HEL, https://voutu.be/PV3ifR-FUFc?si=Maz1HYxlHCuix4fp.

Airborne and Space 8ased Lasers, An Analysis of Technological and Operational Compatibility, Kenneth W. 8arker, Lt. Colonel, USAF, Jun. 1999; Occasional Paper No. 9, Center for Strategy and Technology, Air War College Air University Maxwell Air Force Base.

High Power Optical Cavity Design and Concept of Operations for a Shipboard Free Electron Laser Weapon System, Timothy S. Fontana, Dec. 2003; Naval Postgraduate School Monterey, California NLP5: Direct-energy weapons: invisible and invincible? Sep. 2007; Deveci, Bayram Mert Monterey, California. Naval Postgraduate School http://hdl.handle.net/10945/3311.

Atmospheric Compensation and Tracking Using Active Illumination, Charles Higgs, Herbert T. Barclay, Daniel V. Murphy, and Charles A. Primmerman; vol. 11, No. 1, 1998 Lincoln Laboratory Journal.

Marine beabsichtigt in Kürze Laserwaffe auf einer K130 zu testen, MBDA; Andre Forkert.

Scanned Laser Illuminator/Receiver, R. A. Honzik and F. B. Warren Martin Marietta Corporation Florida 32805, Nov. 1976.

Hochleistungs-/Hochenergie-Lasertechnologie: Einsatzpotenziale für Streitkräfte, Kooperationsveranstaltung mit dem Fraunhofer-Verbund Verteidigungsund Sicherheitsforschung (VVS)und der Deutschen Gesellschaft für Wehrtechnik (DWT), Sektion Berlin-Brandenburg; Referent: Prof. Dr. rer. nat. Marc Eichhorn, Bereichsleiter ,,Photonik und optronische Systeme am Fraunhofer IOSB; Professor am Karlsruher Institut für Technologie (KIT) Kommentar: Doris Laarmann, MBDA.

Opposition filed in corresponding German Application No. 10 2020 119 620.2, dated Nov. 7, 2024.

Office Action from corresponding German Patent Application No. 10 2020 119 620.2. issued on Mar. 5, 2021.

International Search Report from corresponding PCT Application No. PCT/EP2021/070625, dated Mar. 18, 2022.

Written Opinion from corresponding PCT Application No. PCT/EP2021/070625, dated Mar. 18, 2022.

* cited by examiner

METHODS AND DEVICES FOR REDUCING EYE SAFETY MINIMUM DISTANCES IN CONJUNCTION WITH ILLUMINATION LASER RADIATION

CROSS-REFERENCE TO RELATED APPLICATIONS

This application is a continuation application of PCT Application No. PCT/EP2021/070625, filed on 23 Jul. 2021, which claims the benefit and priority to German Patent Application No. 10 2020 115 703.7, filed on 24 Jul. 2020. The entire disclosures of the applications identified in this paragraph are incorporated herein by references.

FIELD

The present invention relates to methods and devices for reducing eye safety minimum distances during the active observation of objects and during fine tracking by means of illumination laser radiation. The eye safety minimum distance is also referred to as a non-ocular hazard distance, abbreviated NOHD. It represents the distance of a person from a laser radiation source at which the laser radiation impinging on the person falls below a predetermined exposure limit EGW.

SUMMARY

In order to illuminate an object in a defined environment, a minimum illumination intensity on the object must be achieved so that an optical sensor that detects the illumination radiation reflected by the object receives sufficiently many photons for an evaluation of the reflected illumination radiation.

In a first method known per se for operating a laser radiation device which has an illumination laser and an active laser, in a first operating mode of the laser radiation device in which the active laser radiates no active laser radiation the illumination laser is operated such that its illumination laser radiation has a first illumination laser radiant flux.

In a laser radiation device that has a first illumination laser beam path and a second illumination laser beam path, wherein laser radiation propagating in the first illumination laser beam path exits from a first aperture of the laser radiation device and laser radiation propagating in the second illumination laser beam path exits from a second aperture of the laser radiation device that is spatially separated from the first aperture, the illumination laser beam paths overlap.

In a second method known per se for adjusting an illumination laser radiant flux, a distance of a target to be illuminated by the illumination laser is measured with a distance measuring device different from the illumination laser.

A third method known per se is used to adjust parameters of an illumination laser, and has the following steps: Measuring a distance of a target to be illuminated by the illumination laser, determining parameters of the illumination laser as a function of the measured distance, emitting at least one laser radiation pulse, directed to the target, of the illumination laser operated with the determined parameters, checking whether laser radiation of the emitted laser radiation pulse is reflected to a detector of the illumination laser and then, if this is the case, determining the distance of the object that reflected the laser pulse as a function of the reflected and detected laser radiation.

For the illumination laser, it is desirable for many reasons (cross-sectional area, cleaning, signature, etc.) to have the smallest possible transmission aperture. This can result in high intensities and thus in undesirably large NOHD values, particularly in the vicinity of the aperture.

For the active observation of objects in space at different distances, it is desirable, particularly in urban use, to achieve low NOHD values for the use of the illumination laser in order to be able to avoid safety-related limitations during the illumination. In order to achieve low NOHD values in this target conflict, transmission apertures for the illumination laser radiation are currently used that are similar in size to transmission apertures of active lasers that emit significantly greater power levels. Another possibility is to limit the power radiated by an illumination laser to a minimum value that is just sufficient for the illumination function. It is also known to use illumination laser radiation with so-called "eye-safe wavelengths" that are concomitant with high exposure limit values (the exposure limit value increases with increasing wavelength).

The restriction of the illumination laser radiant flux is generally disadvantageous because it directly reduces the illumination quality and thus the object recognition quality and resolution. Illumination lasers that emit so-called eye-safe illumination laser radiation are very expensive and have low efficiency.

Against this background, the object of the invention is to specify methods for operating illumination lasers with very low NOHD values, which allow the use of illumination lasers in an urban environment while maintaining exposure limit values even in the case of illumination laser radiation wavelengths that are not generally considered to be "eye-safe." Another object is to specify a device which allows the use of illumination lasers in an urban environment while maintaining exposure limit values. Such use should also be possible in particular with illumination laser radiation wavelengths which are not considered from the outset to be "eye-safe."

This object is achieved in each case with the sum of the features of each independent claim.

According to the invention, the above-mentioned first method is characterized in that, in a second operating mode of the laser radiation device in which the active laser emits active laser radiation, the illumination laser is operated such that its illumination laser radiation has a second illumination laser radiant flux that is greater than the first illumination laser radiant flux.

According to the invention, the above-mentioned laser radiation device is characterized in that an overlap of the two illumination laser beam paths occurs only at a distance from the apertures which is greater than a predetermined minimum distance for each individual one of the two beam paths.

According to the invention, the second above-mentioned method is characterized in that an illumination laser radiant flux of the illumination laser is determined as a function of the measured distance and in that the target is subsequently illuminated by the illumination laser, wherein the illumination laser is operated such that it emits the determined illumination laser radiant flux.

According to the invention, the above-mentioned third method is characterized in that the distance of the object is compared with the distance of the target and in that, when the distance of the object is less than the distance of the target, parameters of the illumination laser are changed such that an exposure limit value at the location of the object is not exceeded by the laser radiation of the illumination laser impinging there.

A preferred embodiment of the first method is characterized in that the illumination laser is operated in the first operating mode and in the second operating mode such that it emits the illumination laser radiation in the form of illumination laser radiation pulses, wherein a repetition frequency with which the illumination laser radiation pulses are emitted is less in the first operating mode than in the second operating mode.

A preferred working method of the laser radiation device is characterized in that it is operated in such a way that the laser radiation propagating in the illumination laser beam paths is fed into the illumination laser beam paths in the form of illumination laser radiation pulses, wherein the illumination laser radiation pulses are fed alternately into the first illumination laser beam path and the second illumination laser beam path from one illumination laser radiation pulse to the next illumination laser radiation pulse.

A preferred embodiment of the second method according to the invention is characterized in that the illumination laser radiant flux is determined such that it also decreases as the distance decreases.

A preferred embodiment of the third method according to the invention is characterized in that the distance of the target is measured with a distance measuring device different from the illumination laser.

It is also preferred that the laser radiation impinging on the location of the object is modified by reducing an average intensity of the laser radiation of the illumination laser.

It is further preferred that the average intensity of the laser radiation is modified by reducing a repetition rate of the illumination laser.

Further advantages are described in the dependent claims, the description and the accompanying figures.

It is understood that the above features and those to be explained below can be used not only in the combination indicated in each case but also in other combinations or on their own, without departing from the scope of the present invention.

BRIEF DESCRIPTION OF THE DRAWINGS

Embodiments of the invention are shown in the drawings and explained in more detail in the following description. In this context, the same reference signs in different figures refer to the same elements or elements that are at least comparable in terms of their function. The figures show the following in a schematic form.

DETAILED DESCRIPTION

Figure 1:
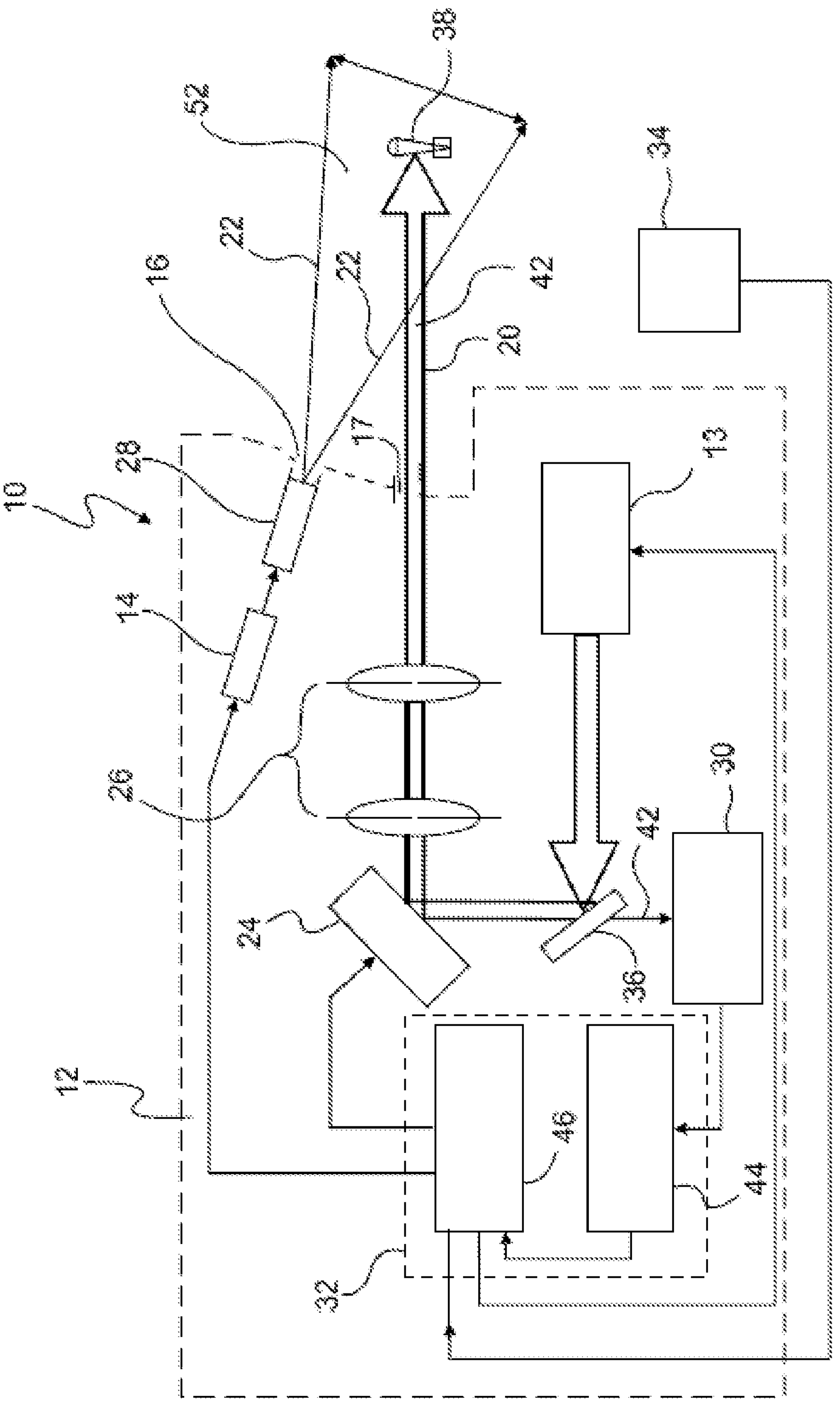
FIG. 1 shows a laser radiation device with which the methods according to the invention can be executed.

Specifically, FIG. 1 shows a laser radiation device 10, which has a housing 12. The housing 12 has a first illumination laser aperture 16, through which illumination laser radiation 22 can exit the housing 12 in a first illumination laser beam path 52. The housing 12 also has an active laser aperture 17, through which an active laser beam can exit the housing 12.

The laser radiation device 10 has an active laser 13, a first illumination laser 14, a deflecting mirror 36 that is reflective for the wavelength of the active laser radiation 20 and is transparent for the wavelength of the illumination laser radiation 22, a tip-tilt mirror 24, which is controllable with respect to its orientation in space, an active laser telescope 26, a first illumination laser telescope 28, an optical sensor 30, a control unit 32, and a distance measuring device 34.

The illumination laser radiation 22 preferably has a different wavelength from the active laser radiation 20.

The first illumination laser 14 is preferably configured to generate pulsed illumination laser radiation as illumination laser radiation 22. Alternatively, the first illumination laser 14 is configured to generate the illumination laser radiation 22 as continuous-wave laser radiation.

The illumination laser radiation 22 exits from the housing 12 through the first illumination laser aperture 16 and, when the laser radiation device 10 is roughly aligned correctly, detects a target 38.

A rough alignment is carried out, for example, by a mechanical alignment device which is configured to roughly align the housing 12, and thus also the laser radiation 20, 22 emerging from the housing 12 in its azimuth and elevation, to the target 38. The rough alignment is controlled, for example, by a radar system that, in one embodiment, also serves as a distance measuring device 34.

The illumination laser radiation 42 reflected by the target 38 propagates through the active laser radiation telescope 26 and, via the tip-tilt mirror 24, to the deflection mirror 36, which is reflective for the wavelength of the active laser radiation 20 and transparent for the wavelength of the illumination laser radiation 22 and the reflected illumination laser radiation 42. The reflected illumination laser radiation 42 passes through the deflection mirror 36 and is acquired by the optical sensor 30. The signal of the optical sensor 30 generated in this manner is evaluated by evaluation software 44 of the control unit 32, and the result of the evaluation is used by a drive unit 46 of the control unit 32 to drive the tip-tilt mirror 24. The driving is such that the tip-tilt mirror 24 aligns any triggered active laser radiation 20 toward the target 38. This alignment represents fine tracking.

The drive unit 46 also controls the first illumination laser 14 and the active laser 13 and processes signals of the distance measuring device 34.

The control of the first illumination laser 14 takes place in such a way that the smallest possible NOHD value is set. For the calculation of the illumination laser parameters that lead to the smallest possible but still sufficiently large powers of the illumination laser radiation 22, in the case of illumination lasers 14 operated in pulse operation, among other things two exposure limit values must be taken into account, namely a peak value EGW_peak ($W/m^2$) for each individual illumination laser radiation pulse and an average value EGW_average ($W/m^2$) for the average power of a sequence of illumination laser radiation pulses. In general, the peak value EGW_peak for an illumination laser radiation pulse is significantly greater than the average value EGW_average. This results in a low NOHD_peak value for low pulse repetition frequencies.

In the calculation of NOHD, further parameters are taken into account beyond the values EGW_peak and EGW_average, of which some are listed below, however this list is by no means exhaustive:

| | |
|---|---|
| Pulse peak power | P_peak |
| Average power | P_average = E_pulse * f_rep |
| Repetition rate | f_rep (number of pulses per time unit) |
| Pulse energy | E_pulse (J) |
| Divergence (beam opening angle) | (rad) |
| Pulse intensity I_peak | ($W/m^2$) |
| Pulse intensity I_average | ($W/m^2$) |
| Wavelength | Lambda (m) |

For the active observation of objects and for fine tracking, comparatively large spatial regions are illuminated over a large area with illumination laser radiation 22. Larger spatial regions are, for example, those which appear at a viewing angle of, for example, 2 mrad to 4 mrad as viewed from the aperture of the illumination laser. Illumination laser radiation 42 reflected by the target 38 or by another object is acquired by the active laser telescope 26 and converted by the optical sensor 30, which is preferably a camera, into electrical signals that are then evaluated by the evaluation software 44 of the control unit 32. Overall, the laser radiation device 10 is configured to carry out a method according to the invention or to control its sequence. The configuration is carried out in particular by corresponding programming of the control unit 32.

In deviation from the illustration in FIG. 1, the illumination laser can also be arranged in a further housing separate from the housing 12 of the active laser 13. The control unit 32 is then located in one of the two housings, for example.

In a further embodiment, the housing 12 accommodates in particular the active laser telescope, and the active laser 13 is arranged outside the housing 12 of the active laser telescope. The active laser radiation is then preferably guided into the housing 12 by means of at least one optical fiber. Alternatively or additionally, illumination laser radiation is guided into the housing 12 by means of one or more optical fibers. It is also preferred that the illumination laser radiation and the active laser radiation are combined with an optical coupler and both propagate through the active laser telescope and are emitted through the same aperture.

Figure 2:
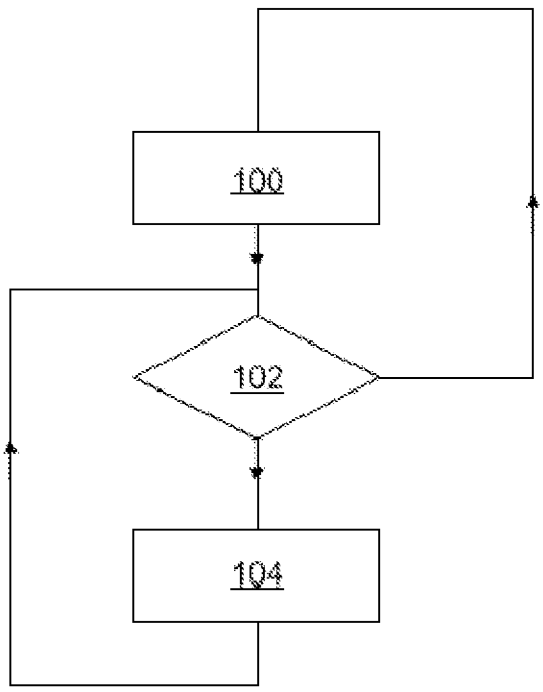
FIG. 2 shows an embodiment of a first method according to the invention with which the illumination laser is operated.

FIG. 2 shows an embodiment of the first method according to the invention, with which the illumination laser is operated.

In this embodiment, which relates to a laser radiation device 10 that has at least one illumination laser 14 and an active laser 13, the illumination laser 14 is operated in two different operating modes. In a first step 100, the illumination laser 14 is operated in a first operating mode of the laser radiation device 10. The first operating mode is characterized in that the active laser 13 does not emit any active laser radiation. In this case, operation takes place with parameters of the illumination laser 14 at which the lowest possible NOHD value results while the power of the illumination laser radiation 22 is still sufficient for the illumination purposes.

In a second step 102, it is checked whether active laser radiation 20 is to be emitted. If this is not the case, the method returns to the first step 100. If, on the other hand, this is the case, in a third step the illumination laser 14 is operated in the second operating mode of the laser radiation device 10. In the second operating mode, active laser radiation 20 is also emitted. The radiation power emitted with the active laser radiation 20 is generally so great that it significantly exceeds the exposure limit values. In this case, it is thus no longer necessary for the illumination laser 14 to comply with exposure limit values. Therefore, in the third step, and thus in the second operating mode, the illumination laser 14 is operated such that its illumination laser radiation 22 has a second illumination laser radiant flux that is greater than the first illumination laser radiant flux. With the larger illumination laser radiant flux, the signal-to-noise ratio of the illumination laser radiation 42 reflected by the object improves, which improves the fine tracking.

The illumination laser radiant fluxes of different magnitudes in the two operating modes are preferably realized in that, in the first operating mode and in the second operating mode, the illumination laser 14 emits illumination laser radiation 22 in the form of illumination laser radiation pulses, wherein a repetition frequency with which the illumination laser radiation pulses are emitted is less in the first operating mode than in the second operating mode. The power of the individual illumination laser radiation pulses remains constant here. Alternatively, the repetition frequency can also be maintained. In this case, the illumination laser is operated in the first operating mode with a lower individual pulse power. Furthermore, mixed forms are also possible, in which both the individual pulse power and the repetition frequency differ from operating mode to operating mode. From the third step 104, the method always returns to step 102, so that termination of the emission of active laser radiation triggers a return to the first operating mode.

Figure 3:
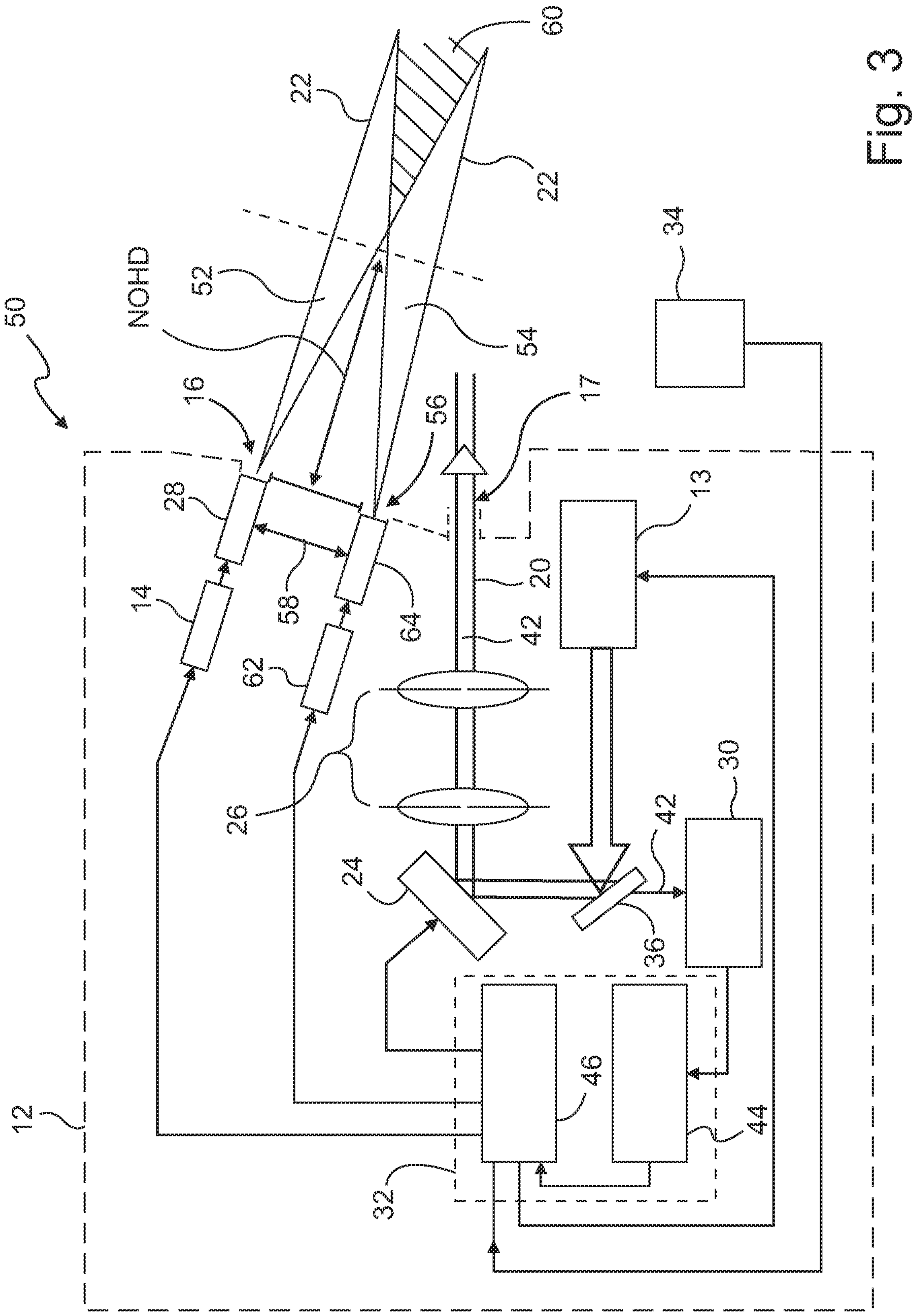
FIG. 3 shows an embodiment of a laser radiation device according to the invention.

FIG. 3 shows an embodiment of a further laser radiation device 50 according to the invention. The laser radiation device 50 differs from the laser radiation device 10 of FIG. 1 on account of an additional, second illumination laser beam path 54. Illumination laser radiation 22 propagating in the first illumination laser beam path 52 exits from a first illumination laser aperture 16 of the laser radiation device 50, and illumination laser radiation 22 propagating in the second illumination laser beam path 54 exits from a second illumination laser aperture 56 of the laser radiation device 50 that is spatially separated from the first illumination laser aperture by a distance 58. As a result, the illumination laser radiation 22 is divided.

The distance 58 of the illumination laser apertures 16, 56 from one another is selected such that the two illumination laser beam paths do not overlap within the eye-safe minimum distance NOHD defined by the exposure limit values to be maintained. The overlap of the two illumination laser beam paths occurs only at a distance from the apertures which is greater than a predetermined minimum distance NOHD for each individual one of the two illumination laser beam paths 52, 54. The radiant fluxes propagating in the two illumination laser beam paths are summed only in the overlap region 60.

The embodiment according to FIG. 3, in terms of its device aspects, deviates from the subject matter of FIG. 1 on account of the additional second illumination laser 62 with its associated second illumination laser telescope 64. In all other respects, the description of FIG. 1 also applies to FIG. 3.

In a preferred embodiment, the laser radiation device 50 is operated such that the laser radiation propagating in the illumination laser beam paths is fed into the illumination laser beam paths in the form of illumination laser radiation pulses, wherein the illumination laser radiation pulses are fed alternately into the first illumination laser beam path 52 and the second illumination laser beam path 54 from one illumination laser radiation pulse to the next illumination laser radiation pulse. The average intensities of the individual illumination laser radiation of the two illumination laser beam paths are then summed on the illuminated object.

Figure 4:
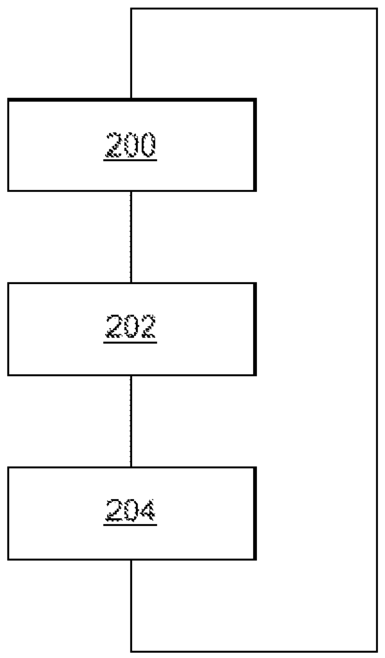
FIG. 4 shows an embodiment of a second method according to the invention.

FIG. 4 shows an embodiment of a second method according to the invention. This method is used to adjust an illumination laser radiant flux. In a first step 200, a distance of a target to be illuminated by the first illumination laser 14 and/or the second illumination laser 62 is measured with a distance measuring device 34 different from the illumination laser 14 and/or 62. The distance measuring device 34 is preferably a radar device, as is also used for rough tracking.

In a second step 202, an illumination laser radiant flux of the illumination laser 14 and/or 62 is determined as a function of the measured distance. Subsequently, in a third step 204 the target is illuminated by the illumination laser 14 and/or 62, wherein the illumination laser 14 and/or 62 is operated such that it emits the determined illumination laser radiant flux. After this, the method returns to the first step 200. The loop of these three steps is continuously run through repeatedly, so that the illumination laser radiant flux is continuously adapted to changing distances of the target 38. Here, the illumination laser radiant flux is determined such that it also decreases as the distance decreases. The illumination laser radiant flux is in particular determined in each case in such a way that the smallest possible NOHD value results while the illumination laser radiation illuminating the target 38 still has sufficient intensity.

Figure 5:
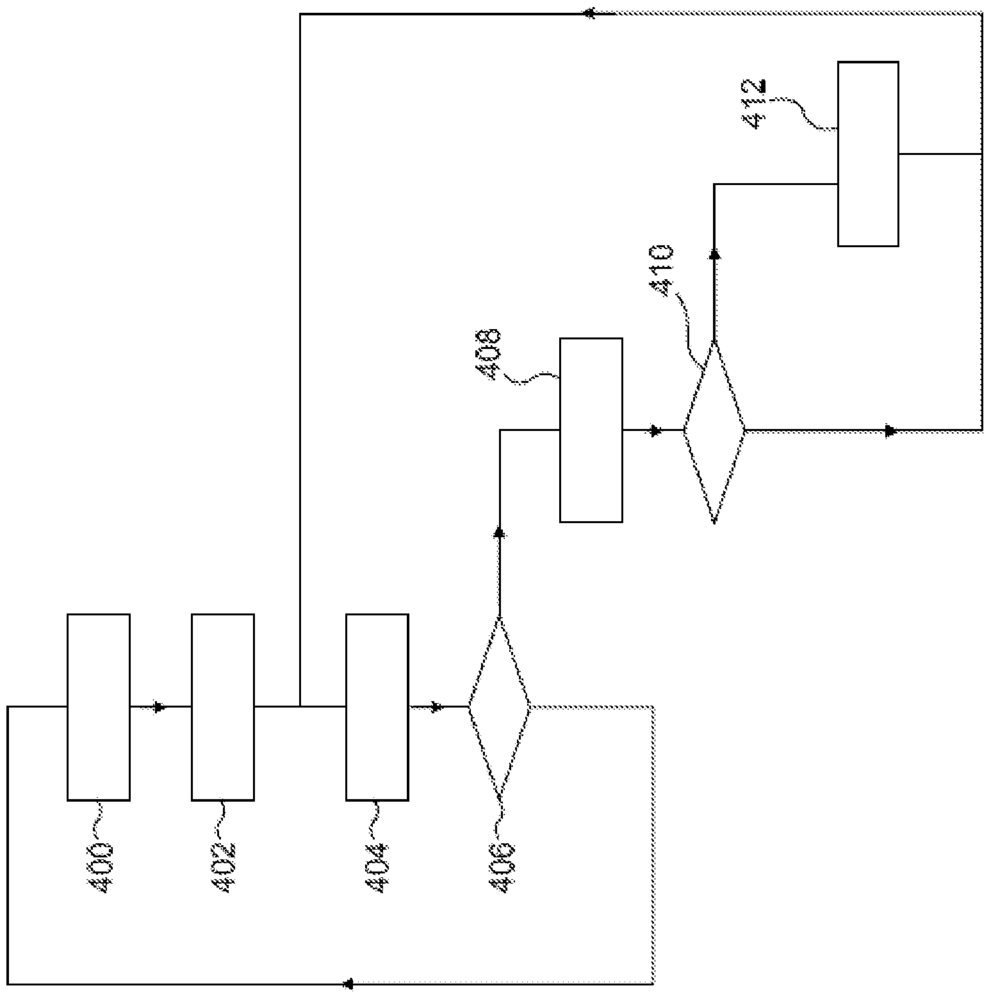
FIG. 5 shows a flow chart as an embodiment of the third method according to the invention for adjusting parameters of an illumination laser.

FIG. 5 shows a flow chart as an embodiment of the third method according to the invention for adjusting parameters of an illumination laser. In a first step 400, it is checked whether a target 38 is to be observed. If no target is to be observed, the check is repeated from time to time without further steps of the methods described here being performed. If, on the other hand, a target is to be observed, then in the first step 400 a distance of a target 38 to be illuminated by the illumination laser 14 and/or 62 to the illumination laser 14 and/or 62 is measured.

The measurement is preferably carried out with a distance measuring device 34 different from the illumination laser 14 and 62. This is, for example, a radar device.

In a second step 402, parameters of the illumination laser 14 and/or 62 are determined as a function of the measured distance.

In a third step 404, the illumination laser 14 and/or 62 operated with the specific parameters emits at least one illumination laser radiation pulse directed onto the target 38. Based on the parameters of the illumination laser 14 and the first aperture 16, the NOHD value for this illumination laser radiation pulse can be determined with pulse energy E_pulse, or E_0.

In a fourth step 406, it is checked whether laser radiation of the emitted laser radiation pulse is reflected to the optical sensor 30 or to another detector of the illumination laser 14 and/or 62.

If this is the case, then in a fifth step 408 the distance of the object that reflected the laser pulse is determined as a function of the reflected and detected illumination laser radiation 42. Alternatively or additionally, the reflection is checked with an optical sensor 30, which may be realized as a camera, as to whether it is imaging a human face.

In a sixth step 410, the distance of the object from the illumination laser 14 and/or 62 is compared with the distance of the target 38 from the illumination laser 14 and/or 62. If the distance of the object is less than the distance of the target, then in a seventh step 412 the parameters of the illumination laser 14 and/or 62 are modified such that an exposure limit value EGW at the location of the object is not exceeded by the laser radiation of the illumination laser 14 and/or 62 impinging there. The same applies to the case in which the reflection images a human face. The reflection with the smallest distance defines the permissible value for the NOHD for the average power P_average.

In one embodiment, the modification takes place in that an average intensity of the laser radiation of the illumination laser is modified.

This can be achieved, for example, by modifying the laser radiation impinging on the location of the object by reducing a repetition rate of the illumination laser.

For a given pulse energy, the maximum permissible repetition rate for the illumination laser can now be determined according to the "Technical Rules for the Occupational Health and Safety Ordinance on Artificial Optical Radiation (TROS laser radiation)" (P_average=E_pulse*f_rep. Subsequently, the method returns to the third step 404.

In contrast, if it is determined in the sixth step 410 that no object is closer to the illumination laser 14 and/or 62 than the target 38, the method returns to the third step 404 without modifying the illumination laser parameters.

If no reflection and thus no target is detected in the fourth step 406, the method returns to the first step 400, in which it is checked whether a target 38 is to be observed.

What is claimed is:

1. A method for operating a laser radiation device that has an illumination laser and an active laser, the method comprising:

operating the laser radiation device in a first operating mode in which the active laser does not emit any active laser radiation and the illumination laser is operated such that its illumination laser radiation has a first illumination laser radiant flux; and operating the laser radiation device in a second operating mode in which the active laser emits active laser radiation and the illumination laser is operated such that its illumination laser radiation has a second illumination laser radiant flux that is greater than the first illumination laser radiant flux, wherein the illumination laser emits the illumination laser radiation as illumination laser radiation pulses in the first operating mode and in the second operating mode, wherein an individual pulse power of the illumination laser radiation pulses remains constant in the first operating mode and in the second operating mode, and wherein the second illumination laser radiant flux is greater than the first illumination laser radiant flux by emitting the illumination laser radiation pulses at a higher repetition frequency in the second operating mode than in the first operating mode.

2. A method for adjusting parameters of an illumination laser, the method comprising the steps of:

measuring a distance of a target to be illuminated by the illumination laser;

determining parameters of the illumination laser as a function of the measured distance;

emitting at least one laser radiation pulse, directed to the target, of the illumination laser operated with the determined parameters;

detecting whether laser radiation of the emitted laser radiation pulse is reflected to an optical sensor; and if this is the case, determining a distance of an object that reflected the laser pulse as a function of the reflected and detected laser radiation, wherein the distance of the object is compared with the distance of the target and in that, if the distance of the object is less than the distance of the target, parameters of the illumination laser are modified in such a way that an exposure limit value (EGW) at a location of the object is not exceeded by the laser radiation of the illumination laser impinging there, wherein the at least one laser radiation pulse is one of a plurality of laser radiation pulses emitted by the illumination laser, and wherein modifying the parameters of the illumination laser comprises using a reflection with a smallest determined distance to define an average power value at which the exposure limit value (EGW) at the location of the object is not exceeded, and reducing a repetition rate of the plurality of laser radiation pulses to be less than or equal to a maximum repetition rate determined from the average power value and a pulse energy of each of the plurality of laser radiation pulses.

3. The method according to claim 2, wherein the distance of the target is measured with a distance measuring device different from the illumination laser.

4. The method according to claim 2, wherein the laser radiation impinging on the location of the object is modified by reducing an average intensity of the laser radiation of the illumination laser.

5. The method according to claim 2, wherein an average intensity of the laser radiation is modified by reducing a repetition rate of the illumination laser.

* * * * *